April 15, 1952 — C. RICHARDSON — 2,593,186
STAKE OR POST DRIVER
Filed Dec. 31, 1949 — 2 SHEETS—SHEET 1
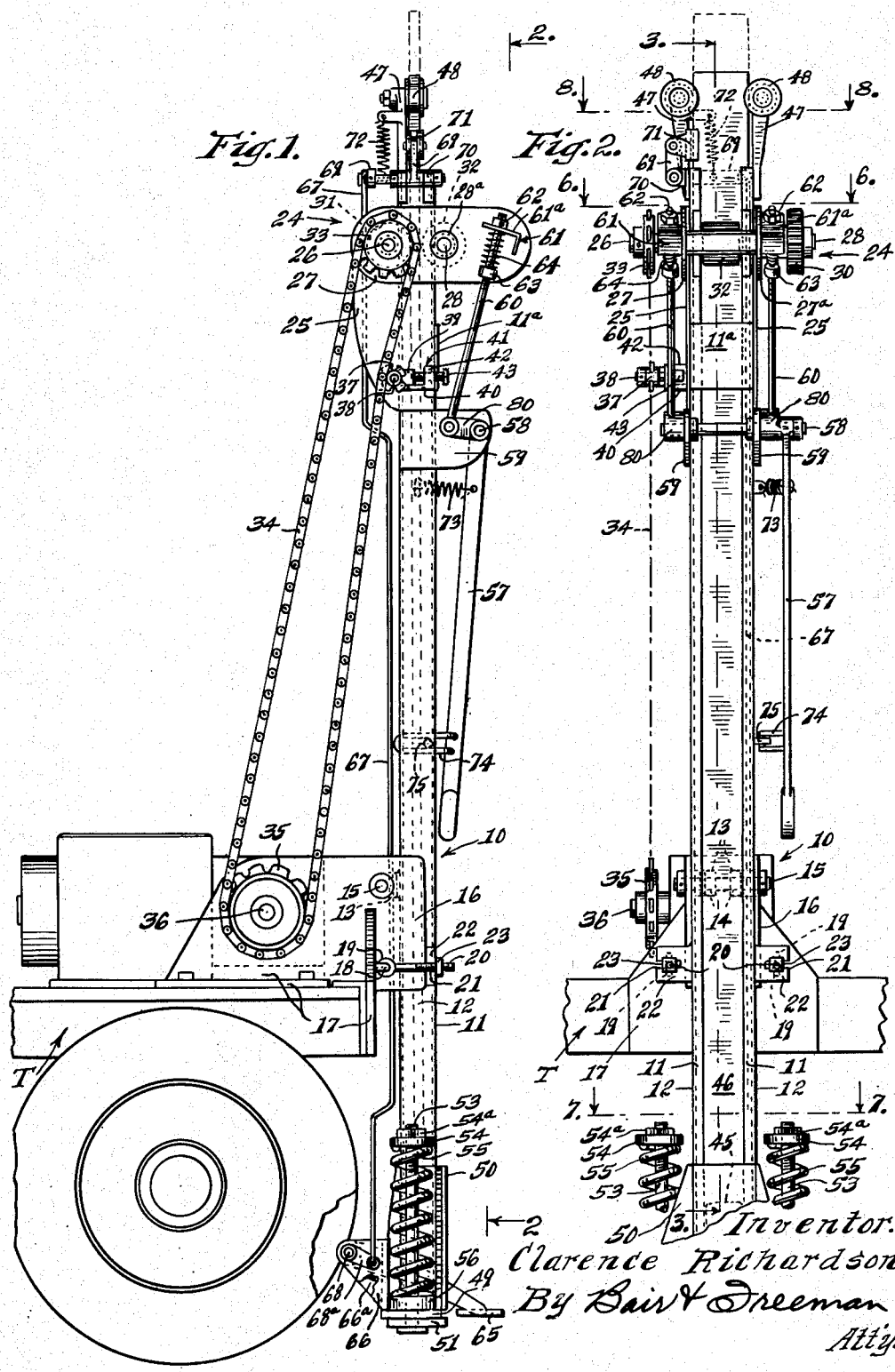
Inventor.
Clarence Richardson.
By Bair & Freeman
Att'ys.

April 15, 1952   C. RICHARDSON   2,593,186
STAKE OR POST DRIVER
Filed Dec. 31, 1949   2 SHEETS—SHEET 2
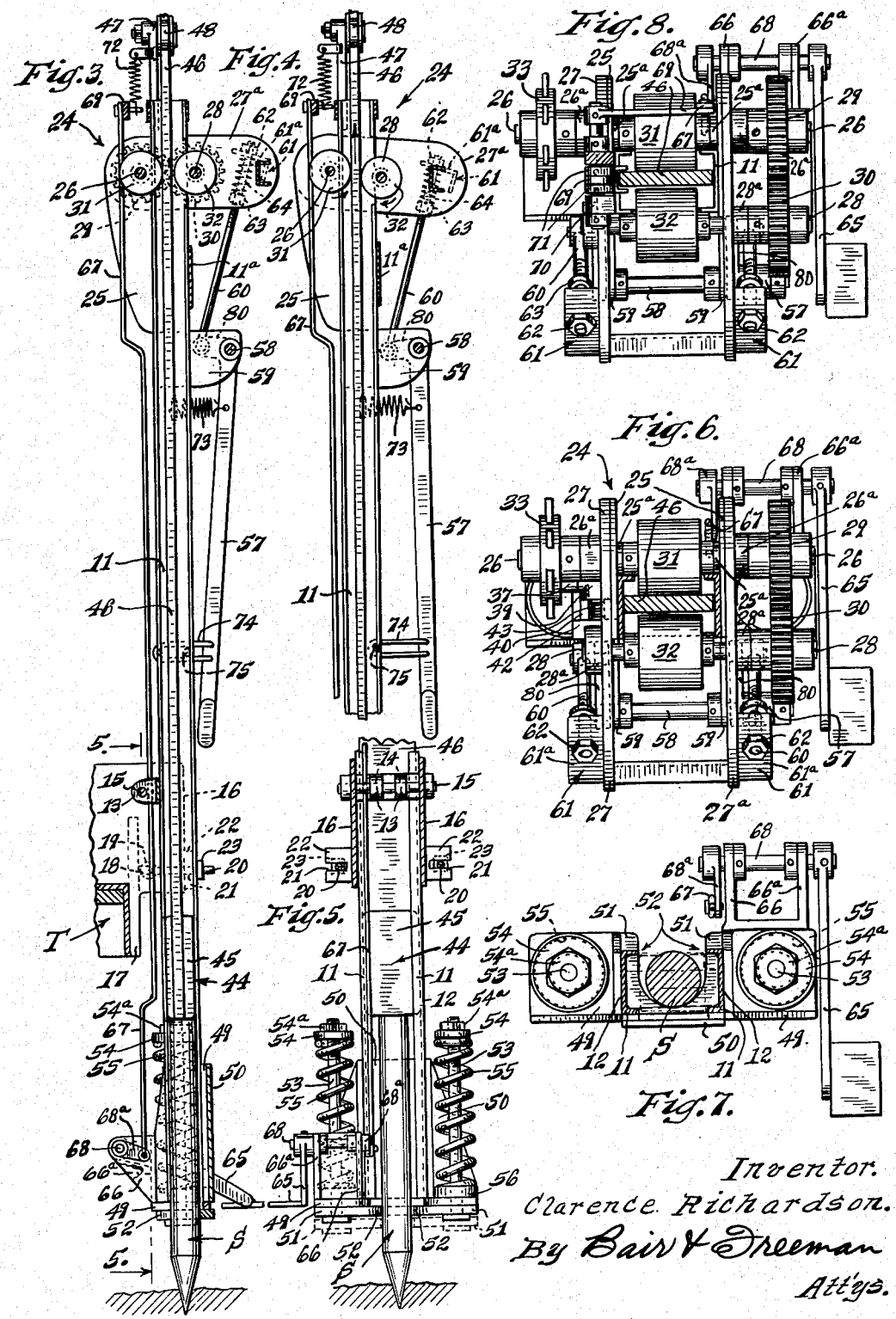
Inventor.
Clarence Richardson.
By Bair & Freeman
Att'ys.

Patented Apr. 15, 1952

2,593,186

UNITED STATES PATENT OFFICE 2,593,186

STAKE OR POST DRIVER

Clarence Richardson, Lake City, Iowa, assignor of one-half to Richard F. Blanchfield, Lake City, Iowa Application December 31, 1949, Serial No. 136,307

8 Claims. (Cl. 61—74)

This invention relates to a portable machine for driving stakes or posts.

There are many instances when a stake and post driver may be utilized around a farm, a circus or carnival, or by road builders. Very often a great number of stakes must be driven and the use of a mechanical stake and post driver has many obvious advantages. The use of a mechanical post driver is more rapid and more efficient, and hence more economical.

Thus one of the objects of this invention is to provide a mechanical stake and post driver and drive means therefor which can be easily mounted on the end of a truck, and which may be easily swung out of position when not in use.

Another object of this invention is to provide a mechanical stake and post driver having a simple grasping device, and control means therefor, to grasp and raise the driving hammer of the mechanical stake and post driver.

A further object of this invention is to provide a mechanical stake and post driver having in combination a brake arrangement adapted to hold the driving hammer in a suspended position after the grasping and raising means release the driving hammer.

A further object of this invention is to provide a mechanical stake and post driver having a combination end stop and shock absorber for the driving hammer of said stake driver.

A still further object of this invention is to provide a mechanical stake and post driver which may be easily and inexpensively produced and which is characterized by its simplicity of operation.

With these and other objects in view, my invention consists in the construction, arrangement, and combination of the various parts of my device whereby the objects contemplated are attained, as hereinafter more fully set forth, pointed out in my claims, and illustrated in the accompanying drawings, wherein:

Figure 1 is a side view of the stake driving machine mounted on the rear end of a truck.

Figure 2 is a rear elevation of the stake driving machine taken on the line 2—2 of Figure 1.

Figure 3 is a vertical cross-sectional view of the stake driving machine taken on the line 3—3 of Figure 2 and showing a stake in position.

Figure 4 is a similar cross-sectional view of the upper portion of the stake driving machine showing the operating handle and rollers in operating position.

Figure 5 is a front elevation of the lower portion of the stake driving machine taken on the line 5—5 of Figure 3, particularly showing the brake pedal and the shock absorbing device.

Figure 6 is an enlarged plan view of the grasping rollers taken on the line 6—6 of Figure 2.

Figure 7 is an enlarged horizontal sectional view of the shock-absorbing mechanism taken on the line 7—7 of Figure 2.

Figure 8 is an enlarged plan view taken on line 8—8 of Figure 2 which clearly shows the brake shoe and parts of the brake shoe actuating linkage.

Referring to Figure 1, I have shown a stake driving machine indicated generally by numeral 10, mounted on the rear end of a truck T. A pair of guide channels 11, which may be ordinary structural channel sections, are positioned so that their flanges project toward each other. Cross pieces 11a at the top and 50 at the bottom connect the channels 11 together. Welded to the front flanges of the channels are ears 13 having bores 14 therethrough. A pivot pin 15, passing through the bores 14 and supported by flanges 16, pivotally supports the stake driving machine 10.

The flanges 16 are part of a supporting bracket structure 17 which is bolted or otherwise fastened to the floor of the rear end of the truck T or other transporting means. Mounted on each side of the bracket 17 are a pair of perforated ears 18 to which are pivoted the eyes 19 of eye bolts 20. The threaded portions of the eye bolts 20 are positioned to be swung into slots 21 of bifurcated ears 22 welded to the web 12 of each channel 11. A nut 23 on each eye bolt 20 cooperates with the threaded portion of the bolt to clamp the ears 22 against the rear edges of the flanges 16 so as to fix the channels 11 in an upright position when it is desired to use the stake driver.

Mounted adjacent the upper ends of the guide channels 11 is a device, generally indicated by numeral 24, for raising the hammer. Affixed to the webs 12 of the guide channels 11 are a pair of plates 25 through which is journalled in suitable bearings 25a, a shaft 26. Pivotally mounted by means of bearing 26a on shaft 26 are two plates 27 and 27a, which remain stationary as shaft 26 rotates. A second shaft 28 is rotatably supported by bearings 28a on the plates 27 and 27a. A pair of meshing gears 29 and 30 are mounted on shafts 26 and 28 adjacent plate 27a. A pair of grasping rollers 31 and 32 are mounted on shafts 26 and 28 between the guide channels 11. Shaft 26 is driven by a sprocket wheel 33 mounted on that shaft and adjacent plate 27. The sprocket wheel 33 is driven by a chain 34 which in turn is actuated by a second sprocket wheel 35 mounted on a shaft 36 which is journalled in flanges 16 mounted on the truck. The means for driving sprocket wheel 35 is not shown, but it could be either the truck motor or some other auxiliary drive. An idling sprocket 37 is provided for taking up the slack in chain 34. This idling sprocket 37 is mounted on a shaft 38 journalled in a block 39, which block is supported by the horizontal leg 40 of an angle bracket 41. Angle bracket 41 is welded to web 12 of one of the guide channels 11. The vertical leg 42 of angle bracket 41 is threaded to cooperate with a threaded bolt 43 which is rotatably fixed to block 39. The slack in chain 34 is taken up by varying the position of idling sprocket 37 and block 39 through the cooperation of bolt 43 and angle bracket leg 42.

Referring to Figure 3, the driving hammer, indicated generally by numeral 44, is shown as comprising a driving weight 45 having extending vertically upwards therefrom a strip-like arm 46. The weight 45 is dimensioned to fit within the channel guides 11 and the strip-like arm 46 is long enough to extend above the guide channels and a guide means positioned thereon, when the driving weight 45 is resting at a stop provided at the bottom end of guide channels 11. The guide means just mentioned comprises a pair of brackets 47 mounted on the upper ends of the guide channels 11 which have mounted thereon a pair of flanged guide wheels 48 arranged to engage and position the strip-like arm 46 to prevent any sidewise and fore-and-aft motion of arm 46.

The lower ends of guide channels 11 are provided with a shock-absorbing means comprising a pair of horizontally extending shoulders 49 welded on the lower ends of guide channels 11 and projecting outwardly from the sides of the guide channels. To more adequately support shoulders 49 a plate 50 in the shape of an isosceles trapezoid is provided welded to the shoulders 49 and to the back flanges of guide channels 11. A stop plate 51 is positioned below and adjacent the shoulders 49. This stop plate 51 has a cutout 52 therein which is smaller than the cross-sectional size of the hammer weight 45. The cutout 52 is large enough to receive the post to be driven and the portions of stop plate 51 extending across the guide section act as a stop for driving weight 45. Since the driving weight 45 is nearly the same size as the guide section, it will be stopped by stop plate 51 when in its lowest position.

As shown in Figure 5, a pair of bolts 53 pass vertically through holes in stop plate 51 and engage said stop plate 51 with their heads. These bolts pass through holes provided in the shoulders 49 for that purpose. These bolts 53 further have threaded onto their upper ends enlarged nuts 54 which serve as spring seats. The seats are locked on the bolts by lock nuts 54a. A pair of compression springs 55 surrounding the bolts 53 are seated at their upper ends against the nuts 54 and at their lower ends against the shoulders 49 to bias the stop plate 51 against the shoulders 49. Figure 5 also shows in a broken-line view how stop plate 51 is depressed by the impact of driving hammer 44. A pair of rubber mats 56 are provided between springs 55 and shoulders 49.

In order to tilt plates 27 so that the extended arm 46 of driving hammer 44 may be grasped between rollers 31 and 32, there is provided a control handle 57 fixed to a shaft 58. Shaft 58 is journalled in a pair of brackets 59 welded to the webs 12 of guide channels 11. Also fixed to shaft 58 are a pair of arms 80. These arms 80 each have pivoted at the free end thereof an actuating rod 60. The rods 60 pass through the upper flange 61a of an angle shaped cross piece 61 welded to plates 27 and 27a. A nut 62 is threaded onto the extended end of each rod 60 to cooperate with flange 61a to move plates 27 and 27a downwards when the rods 60 are actuated in that direction. A second nut 63 is threaded on each rod 60 and a compression spring 64 is concentrically mounted on each rod seated between nut 63 and flange 61a. These springs 64 bias plates 27 and 27a back to raised position when rods 60 are moved upwardly.

A tension spring 73 affixed at one end to one of the guide channels 11 and at the other end to control handle 57 biases the control handle and the plates 27 and 27a to a position where rollers 31 and 32 do not grasp arm 46. A limit stop 74 is provided mounted on control arm 57 and cooperating with a pin 75 mounted on one of the guide channels 11 to limit the motion of the control arm in the direction that it is moved to tilt the plates 27 so that rollers 31 and 32 grasp hammer arm 46. As rollers 31 and 32 wear down, the plates 27 and 27a may be pre-tilted so as to bring rollers 31 and 32 closer to each other. This provides that the amount of motion of control arm 57 necessary to operate the grasping means is kept substantially constant. This pre-tilting is accomplished by adjusting nut 62 on threaded rod 60. Nut 62, butting against flange 61a biases plates 27 and 27a to the pre-tilted position.

A brake device to keep the hammer uplifted after the grasping rollers 31 and 32 have released the arm 46 is provided as shown in Figures 2, 3 and 5. There is provided a foot pedal 65 secured to a rock shaft 68 which is journalled in supports 66 and 66a mounted on one of the guide channels 11. Foot pedal 65 actuates a rod 67 through the rock shaft 68 and an arm 68a thereon and rod 67 further actuates a bell crank 69 (see Fig. 2). Bell crank 69 is pivotally mounted on a bracket 70 attached to the top of one of the guide channels 11. Bell crank 69 forces a brake shoe 71 against one edge of arm 46 to restrain the hammer 44 in an elevated position. A spring 72 is provided for biasing the brake shoe 71 to a normally off-position when the brake is not being used.

In operation, the drive chain 34 continuously rotates sprocket wheel 33 which in turn rotates shaft 26. Gear 29 on shaft 26 rotates continuously and drives gear 30 which rotates shaft 28. In the normal position of Fig. 3 the distance between the rollers 31 and 32 on shafts 26 and 28 is greater than the thickness of the arm 46. When the control arm 57 is pulled outward, plates 27 and 27a are depressed as shown in Figure 4 and the rollers 31 and 32 are forced against the two broad sides of arm 46. These rollers 31 and 32 are made of wood, fibre or other material having a large coefficient of friction and they seize the hammer arm 46 and lift the hammer 44. The arm 46 is further kept in alignment by wheels 48.

After the hammer is raised a desired distance, the brake is applied and the control arm is released. As the hammer 44 is kept in an upraised position, the operator puts a stake between the channels and guided by cutout 52 in plate 51. Then the foot brake is released and the hammer drops against the head of the stake. The hammer 44 is then repeatedly raised and permitted to drop by actuating the control arm 57 so that the rollers seize the hammer arm 46 to raise the hammer and then releasing the control arm so that the hammer falls against the stake.

As the stake passes below the stop plate 51, the driving weight 45 strikes the stop plate 51 but the shock is absorbed by the spring arrangement provided for that purpose.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A stake or post driver comprising an upright guide means, a driving hammer positioned in said guide means and comprising a driving weight with an elongated arm attached thereto extending vertically upwards, gripping means for engaging the elongated arm of said driving hammer to elevate said driving hammer, said gripping means comprising a pair of rollers spaced apart and positioned to receive therebetween the elongated arm, a pair of shafts upon which said rollers are mounted, the distance between the centers of said shafts being fixed, a pair of plates adjacent said upright guide means and journalling therein said pair of shafts, a pair of gears fixedly mounted on said pair of shafts and meshing with each other, means for driving said rollers, and means for pivoting said plates around the axis of one of said shafts so that the rollers grip the elongated arm extending therebetween so as to elevate the driving hammer when the plates are pivoted in one direction, said rollers releasing said elongated arm when said plates are pivoted in the opposite direction.

2. A stake or post comprising an upright guide means, a driving hammer positioned in said guide means and comprising a driving weight with an elongated arm attached thereto extending vertically upwards, gripping means for engaging said arm of said driving hammer to elevate said driving hammer, said gripping means comprising a pair of rollers spaced apart and positioned to receive therebetween said elongated arm, a pair of shafts upon which said rollers are mounted, the distance between the centers of said shafts being fixed, a pair of plates adjacent said upright guide means and journalling therein said pair of shafts, a pair of gears mounted on said pair of shafts and meshing with each other, means for driving said rollers, means for pivoting said plates around the axis of one of said shafts so that the rollers grip said elongated arm extending therebetween so as to elevate the driving hammer when the plates are pivoted in one direction, said rollers releasing said arm when said plates are pivoted in the opposite direction, and shock absorbing means for said hammer mounted on the lower end of said upright guide and engaged by the hammer adjacent its lower limit of movement.

3. A stake or post driver comprising an upright guide means, a driving hammer positioned in said guide means and comprising a driving weight with an elongated arm attached thereto extending vertically upwards, gripping means for engaging said arm of said driving hammer to elevate said driving hammer, said gripping means comprising a pair of rollers spaced apart and positioned to receive therebetween said elongated arm, a pair of shafts upon which said rollers are mounted, the distance between the centers of said shafts being fixed, a pair of plates adjacent said upright guide means and journalling therein said pair of shafts, a pair of gears mounted on said pair of shafts and meshing with each other, means for driving said rollers, means for pivoting said plates around the axis of one of said shafts so that the rollers grip said elongated arm extending therebetween so as to elevate the driving hammer when the plates are pivoted in one direction, said rollers releasing said arm when said plates are pivoted in the opposite direction, and brake means for keeping the driving hammer elevated after the gripping rollers release said elongated arm.

4. Shock absorbing means for use with a stake driver having an upright guide means and a driving weight positioned in said guide means; said shock absorbing means comprising a horizontal end plate adjacent the lower end of said upright guide means, said horizontal plate having a cutout therein forming a guide for the stake or post, said cut-out being smaller than the driving weight, a pair of shoulders affixed to said upright guide means above the horizontal end plate, spring means mounted on said shoulders, and means for suspending said horizontal end plate from the spring means so that any shock resulting from contact between said driving weight and the end plate is absorbed.

5. A stake or post driver comprising an upright guide means, a driving hammer positioned in said guide means and comprising a driving weight with an elongated arm attached thereto extending vertically upwards, gripping means for engaging said arm of said driving hammer to elevate said driving hammer, said gripping means comprising a pair of rollers spaced apart and positioned to receive therebetween said arm, and means for mounting said rollers so that the vertical planes through their centers may be moved toward each other so that the rollers grip said arm and away from each other so that the rollers release said arm, the distance between the centers of the rollers remaining constant.

6. A stake or post driver comprising an upright guide means, a driving hammer positioned in said guide means and comprising a driving weight with an elongated arm attached thereto extending vertically upwards, gripping means for engaging said arm of said driving hammer to elevate said driving hammer, said gripping means comprising a pair of rollers spaced apart and positioned to receive therebetween said arm, means for mounting said rollers so that vertical planes through their centers may be moved toward each other so that the rollers grip the said arm and away from each other so that the rollers are displaced to a non-gripping position, the distance between the centers of the rollers remaining fixed as the rollers are moved to gripping and non-gripping positions, and means for varying the initial distance between the vertical planes which pass through the centers of said rollers when the rollers are in the non-gripping position, said last means providing an adjustment for close clearance between the rollers and said arm as the rollers wear down.

7. A stake or post driver comprising an upright guide means, a driving hammer positioned in said guide means and including a driving weight with an elongated arm attached thereto extending vertically upward, gripping means for engaging the elongated arm of said driving hammer to elevate said driving hammer, said gripping means comprising a pair of rollers spaced apart and positioned to receive therebetween said elongated arm, a pair of shafts upon which said rollers are mounted, the distance between the centers of said shafts being fixed, a pair of gears mounted on said pair of shafts and meshing with each other, means for swinging one of said shafts arcuately around the center of the other shaft, whereby vertical planes through the centers of said shafts are moved closer together so that the horizontal spacing between rollers is reduced, said rollers gripping the elongated arm extending therebetween so as to elevate the driving hammer when said shaft is so swung, and said rollers releasing said elongated arm when said shaft is swung toward the original position.

8. A stake or post driver comprising an upright guide means, a driving hammer positioned in said guide means and including a driving weight with an elongated arm of rectangular cross section attached thereto extending vertically upward, said elongated arm having pairs of opposite sides and opposite edges, gripping means for engaging the pair of opposite sides of said elongated arm to elevate said driving hammer, said gripping means comprising a pair of rollers spaced apart and positioned to receive therebetween said elongated arm, a pair of shafts upon which said rollers are mounted, the distance between the centers of said shafts being fixed, a pair of gears fixedly mounted on said pair of shafts and meshing with each other, means for swinging one of said shafts arcuately around the center of the other shaft, whereby the horizontal spacing between the rollers is varied, said rollers being adapted to engage said elongated arm when the horizontal spacing is reduced and for releasing the elongated arm when the horizontal spacing therebetween is increased, and brake means for engaging one edge of said arm to clamp the other edge of said arm against said guide means for keeping the driving hammer elevated after the gripping rollers release said arm.

CLARENCE RICHARDSON.

REFERENCES CITED

The following references are of record in the file of this patent:

UNITED STATES PATENTS

| Number | Name | Date |
|---|---|---|
| 1,037,875 | Craig | Sept. 10, 1912 |
| 2,125,861 | Deckard | Aug. 2, 1938 |
| 2,487,530 | Dirksen | Nov. 8, 1949 |